June 10, 1969 W. LAMMERS 3,448,834
SURGE BRAKE SYSTEM
Filed Jan. 30, 1967 Sheet 1 of 2

INVENTOR
WALTER LAMMERS
BY
Dich, Zarley, McKee & Thomte
ATTORNEYS

INVENTOR
WALTER LAMMERS
BY
Dick, Zarley, McKee & Thomte
ATTORNEYS

United States Patent Office 3,448,834
Patented June 10, 1969

3,448,834
SURGE BRAKE SYSTEM
Walter Lammers, Everly, Iowa 51338
Filed Jan. 30, 1967, Ser. No. 612,667
Int. Cl. B60t 7/20
U.S. Cl. 188—112                7 Claims

ABSTRACT OF THE DISCLOSURE

The device for automatically applying the brakes to the ground support wheels of a vehicle upon the lead vehicle moving at a relatively slower speed. A safety device is included which will mechanically operate the brakes on the trailing vehicle in the event that the two vehicles become disconnected and separated from each other.

A trailer being pulled behind a lead vehicle will under certain conditions have greater acceleration, momentum, or velocity than the lead vehicle. For example, when the brakes of the lead vehicle are applied, the momentum of the trailing vehicle will tend to move the lead vehicle forward at its previous rate of speed. Thus, a need for an automatic surge brake system for a trailer or the like is necessary such that when the speed of the lead vehicle is reduced the trailing vehicle will in a corresponding degree independently have its speed reduced. Moreover, should the lead and trailing vehicles become disconnected and separated the trailing vehicle should be prevented from running loose. More than a safety chain is necessary for minimizing the danger of this situation. What is needed is that the brakes of the trailing vehicle be automatically applied upon a predetermined separation of the lead and trailer vehicle. The brake control system for the trailer vehicle must take into consideration that there will be minor variations in speed acceleration and momentum and these changes should not effect operation of the automatic brake system.

In summary, this invention involves a telescoping tongue on a trailer connected to a lead vehicle which upon being contracted actuates a hydraulic cylinder connected to the brakes of the trailer. A cable is mechanically connected between the hydraulic cylinder of the trailer brake system and to the lead vehicle such that upon accidental disconnection and separation of the two vehicles the trailer brake cylinder will be operated and consequently the trailer brakes applied to stop the trailer. A stop latch is provided to lock the brakes in their operational position. To prevent undesired operation of the trailer brakes a dampening unit is interconnected between the telescoping sections of the trailer tongue. When the trailer is being pulled the tongue sections are expanded against the action of a spring and when the trailer moves forward relative to the lead vehicle it is resisted by the action of the dampening unit and after it has moved a predetermined distance the brake cylinder is actuated thereby causing the trailer brakes to be applied.

These and other features and advantages of this invention will become readily apparent to those skilled in the art upon reference to the following description when taken into consideration with the accompanying drawings, wherein.

Figure 1:
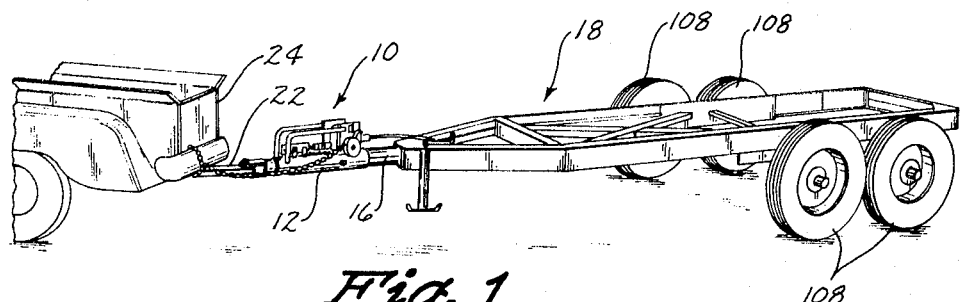
FIG. 1 is a side perspective view of a lead vehicle connected to the tongue of a trailer having the surge brake system of this invention.
Figure 2:
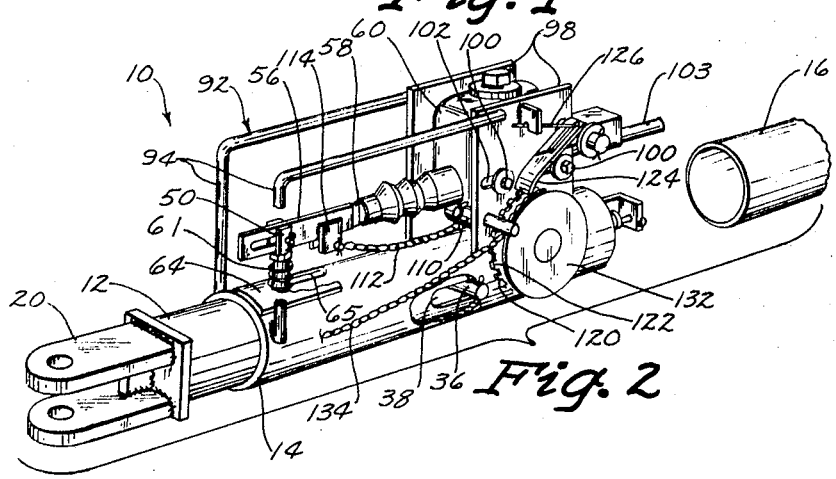
FIG. 2 is an enlarged perspective view of the surge brake system in the tongue assembly only.
Figure 3:
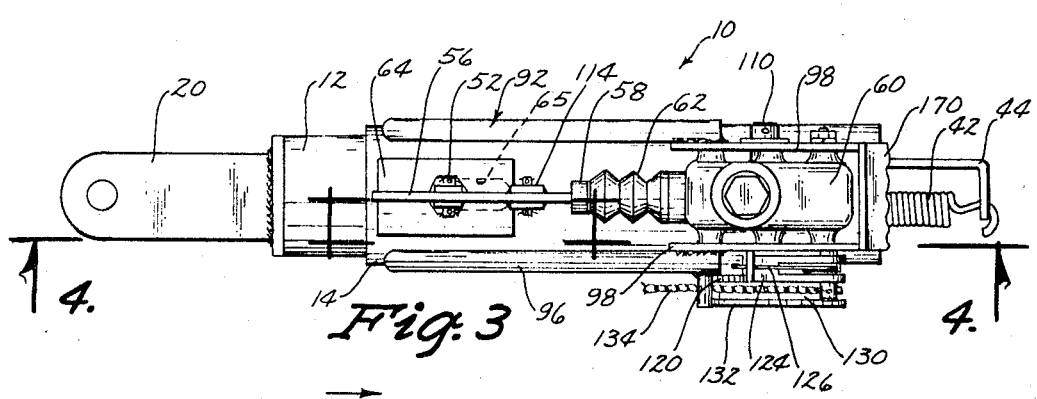
FIG. 3 is a top plan fragmentary view of the tongue assembly with the surge brake system.

In FIG. 2 the surge brake system is referred to generally by the reference numeral 10 and is mounted on a forward cylindrical member 12 which is telescopically received in a rearward cylindrical member 14 which in turn is welded to a cylindrical tongue member 16 integral with a trailer frame 18 (FIG. 1). A clevis 20 is provided on the outer end of the forward telescoping section 12 for detachable engagement with a hitch bar 22 (FIG. 1) on the rear of a powered leading vehicle 24.

The forward telescoping member 12 includes a transversely upstanding integral pin member 26 which includes a portion 28 extending above the tongue section 12. Within the tongue section 12 a dampening unit such as a shock absorber 30 is connected to the upstanding pin 26 and includes a cylinder 32 and a piston rod 34 connected to a second transversely extending pin 36 which is movable at its opposite ends in longitudinally extending slots 38 formed in the side walls of the inner tongue section 12. The outer ends of the pin 36 are anchored to the opposite side walls of the outer section 14. A pair of cotter pins 40 are provided at opposite ends to prevent the pin from accidentally being removed from the tongue sections 12 and 14. A coil spring 42 is also connected to the second pin 36 and extends rearwardly where it is anchored to the rearward end of a bracket 44 integrally connected to the rear end of the inner tongue section 12.

The pin 36 is a load bearing pin and load on the tongue is transmitted through it. The pin 36 engages the rear ends of the slots 38 in the inner member 12 when moving forwardly and the forward ends when moving rearwardly.

The first pin member 26 is movable in a slot 46 formed longitudinally in the forward end of the outer tongue section.

A U-shaped cradle bracket 50 is mounted on the upper end of the pin 26 and carries a connecting pin 52 movable in an elongated slot 54 formed in the outer end of a plate member 56 affixed to the outer end of a piston rod 58 connected to a hydraulic brake cylinder assembly 60 mounted on the outer tongue section 14. Thus a lost motion connection is provided between the pin 26 and the brake cylinder 60. A rubber bellows member 62 extends over the piston rod 58 to protect it from dirt or the like. Similarly, a cover plate 64 is mounted on the upright pin 26 and extends over the longitudinal elongated slots 46 and is held in mating engagement with the outer exterior surface of the outer tongue section 14 by a coil spring 61 on the pin 26.

Figure 7:
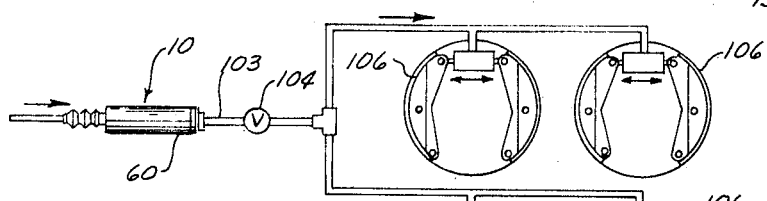
FIG. 7 is a schematic view of the hydraulic system extending from the brake control cylinder to the individual brake shoes.

A pair of right angle guard members 92 include vertical portions 94 rigidly secured to the forward end of the outer tongue section 14 and rearwardly extending portions 96 rigidly secured to oppositely disposed mounting plates 98 for adjustably holding the hydraulic cylinder 60. As seen in FIG. 2, for example, bolt fasteners 100 extend through elongated slots 102 in the mounting brackets 98 and are secured to the housing of the hydraulic cylinder 60. As seen in FIG. 7, a hydraulic fluid line 103 extends from the rear end of the hydraulic cylinder 60 through a check valve 104 to each of four brake units 106 on the trailer 18 for the four ground engaging support wheels 108. The automatic surge brake system can be rendered inoperative by turning off the valve 104 such that when the leading vehicle is backing up it will not actuate the brake system on the trailer and thereby resist the rearward movement.

A shaft 110 extends between the mounting plates 98 under the brake cylinder 60 as seen in FIG. 2 and a chain 112 is anchored to the shaft 110. The opposite end of the chain 112 is connected to the plate member 56 on the piston rod 58 by a U-shaped fastener 114. Outwardly of one of the plates 98 as seen in FIG. 2 is a ratchet wheel 120 rotatable with the shaft 110. The ratchet teeth 122 on the outer periphery of the ratchet wheel 120 are normally engaged by a dog or stop member 124 which is spring biased by a spring 126 into engagement with the teeth such that the shaft 110 may freely rotate only in a counter-clockwise direction as viewed in FIG. 2 and thus upon such rotation retract the piston rod 58 into the hydraulic brake cylinders 60.

Figure 6:
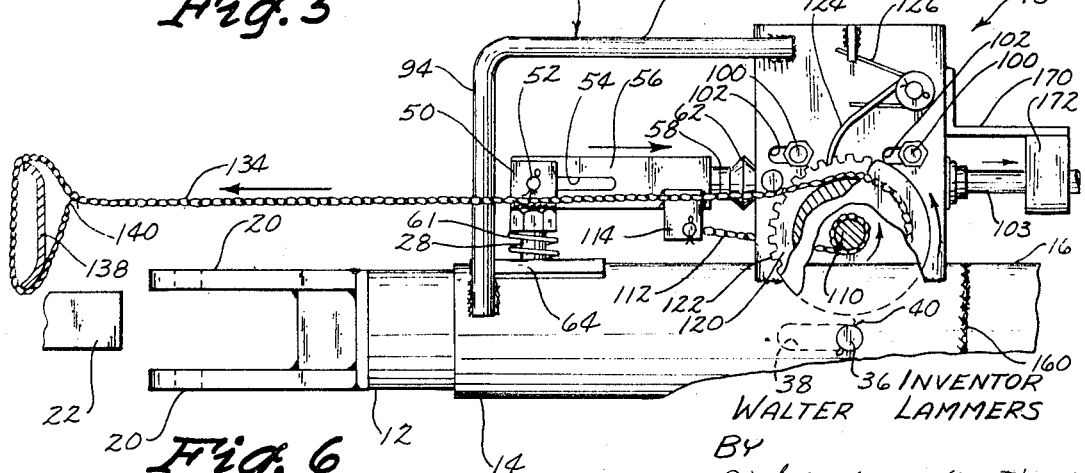
FIG. 6 is a fragmentary side elevation view of the tongue and brake system and illustrated in particularly is the manner in which the safety actuating system is operated upon the leading and trailing vehicles becoming separated from each other.

The ratchet wheel 120 forms one side wall of a channel 130 which includes an outer side wall formed by a disk plate member 132 on the outer end of the shaft 110. A second chain 134 is secured to the shaft 110 in the channel 130 and has its outer free end extending forwardly along the tongue to a connection with the lead vehicle 24. As seen in FIG. 6, the chain 134 extends around the bumper 138 and is loosely held by a hook element 140 which will readily release the chain from the bumper 138 upon the lead vehicle 24 separating from the trailer 18 a predetermined distance such as in the case when the connecting pin 142 has inadvertently been removed from the tongue. The chain 134 however prior to being disconnected from the lead vehicle will rotate the shaft 110 in a counter-clockwise direction and consequently retract the piston into the brake cylinder 60 as seen in FIG. 6 thus bringing the trailer vehicle to a stop and locking the brakes 106 such that the trailer could not move further until the ratchet wheel 120 is turned back clockwise by lifting upwardly on the dog element 124 engaging the ratchet teeth 122.

Figure 4:
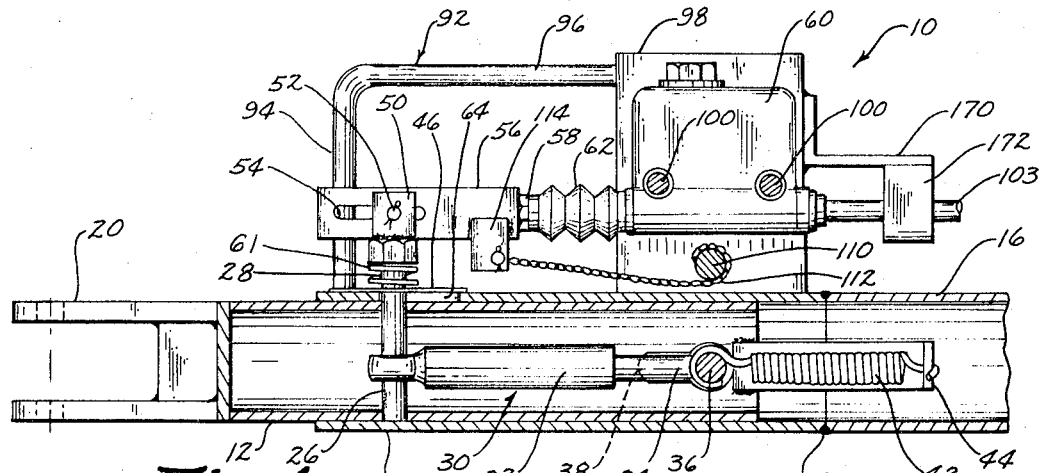
FIG. 4 is a cross-sectional view taken along line 4—4 in FIG. 3 showing the tongue sections extended.
Figure 5:
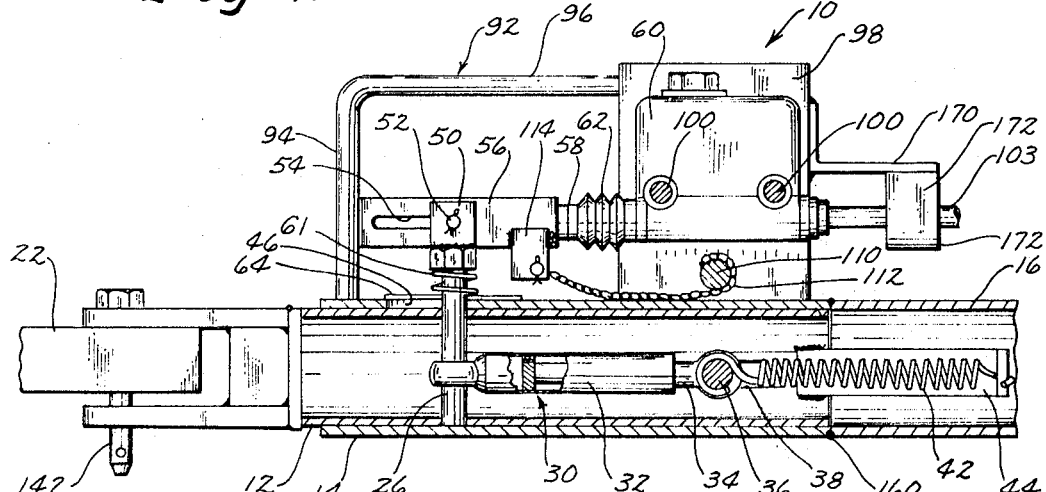
FIG. 5 is a cross-sectional view similar to FIG. 4 but showing the tongue connected to a leading vehicle and the tongue sections contracted and the brake cylinder being operated.

In normal operation it is seen that as the momentum, acceleration and velocity of the lead vehicle and trailer remain substantially constant the brakes 106 on the trailer will not be actuated. Any minor variations will be dampened by the dampening unit 32 and the spring 42 which tend to hold the tongue sections 12 and 14 in their extended telescoping positions as seen in FIG. 4. However, should the lead vehicle suddenly stop, the momentum of the trailer in a forward direction will cause the outer telescoping member 14 to move forwardly over the inner member 12 and the upstanding pin 26 carried by the inner member 12 will be at the rear end of the slot 46 in the outer member 14 and consequently the pin 52 moving in the slot 54 of the plate 56 will engage the rear end thereof to cause the piston rod 58 to be moved rearwardly as seen in FIG. 5. It is also noted that under these circumstances when the tongue is under compression the cross pin 36 will have moved to the forward end of the slot 38 in the inner member 12 and the spring will have been expanded and the dampening unit 32 will have been contracted. The slot 54 in the plate 56 connected to the piston rod 58 permits free travel of the telescoping tongue members 12 and 14 before causing the brake cylinder 60 to be actuated. This free play is controlled by the dampening unit 32 and the spring 42.

The second way in which the hydraulic 60 is operated is as mentioned before, when the lead vehicle separates a predetermined distance from the trailer and pulls the chain 134 forwardly as indicated by the arrow in FIG. 6 and consequently rotates the shaft 110 which in turn through the chain 112 pulls the piston rod 58 rearwardly as indicated by the arrow in FIG. 6 to actuate the cylinder 60. The stop dog plate 124 locks the ratchet wheel 120 such that the brakes 106 are mechanically locked and thereby bringing the trailer to a controlled stop after having been accidentally separated from the leading vehicle.

It is to be appreciated that the surge brake system on the trailer tongue of this invention is constructed to be readily installed on any trailer vehicle or the like and as indicated in this particular embodiment all that is involved is connecting the trailer tongue 116 to the outer telescoping member 14 by weldments 160 as seen for example in FIG. 4.

A guard plate 170 is connected to the rear edges of the cylinder mounting plates 98 to extend over the hydraulic conduit 103 and provide a support for them as the conduit extends through an enlarged opening in a downwardly extending bracket portion 172.

I claim:
1. In combination:
a lead vehicle and a trailer vehicle, said trailer vehicle having a tongue assembly connected to said lead vehicle,
a fluid brake system on said trailer vehicle,
a brake control associated with said tongue assembly, wherein the improvement comprises,
said tongue assembly having a pair of longitudinally movable members and means for actuating said brake system upon said movable members being contracted,
said movable members are telescopically interconnected, said brake system having a hydraulic cylinder mounted on said tongue assembly, means for yieldably expanding said telescoping members, said means for actuating said brake system being carried on one of said movable members and being movable relative to said hydraulic cylinder,
said cylinder is mounted on the outer telescoping member and said actuating means is carried by said inner movable telescoping member,
a dampening unit is interconnected between said first and said second telescoping members and is positioned entirely within said first and second telescoping members,
one end of said dampening unit is connected to said actuating means on said first telescoping member and the opposite end is connected to said outer telescoping member, and
said means for expanding telescoping members is a spring means connected between said outer member and said inner member,
said dampening unit positioned in said inner member and connected to a pin rigidly secured to said outer member and extending through longitudinal slots formed in said inner member.

2. The structure of claim 1 wherein the forward and rearward ends of said slots in said inner member are adapted to be engaged by said pin to limit extension and contraction of said telescoping members.

3. The structure of claim 2 wherein said dampening unit includes said spring means and said spring means is connected to said pin and a piston and cylinder shock absorber are connected to said pin on the opposite side thereof from said spring, said spring having its end remote from said pin connected to said inner member thereby tending to extend said telescoping members and extend said piston and cylinder shock absorber.

4. The structure of claim 3 wherein said shock absorber connected to said pin is connected at its end remote therefrom to a second pin included in said actuating means, said second pin extending transversely of said inner member movable in a slot formed in said outer member, and a link member connected to the outer end of said second pin at one end and to said hydraulic cylinder at its opposite end.

5. The structure of claim 4 wherein a lost motion connection is provided between the link member and said second pin to permit a limited amount of free movement between said telescoping members before said brake cylinder is actuated.

6. In combination:
a lead vehicle and a trailer vehicle, said trailer vehicle having a tongue assembly connected to said lead vehicle,
a fluid brake system on said trailer vehicle,
a brake control associated with said tongue assembly, wherein the improvement comprises,
said tongue assembly having a pair of longitudinally movable members and means for actuating said brake system upon said movable members being contracted,
said movable members are telescopically interconnected, said brake system having a hydraulic cylinder mounted on said tongue assembly, means for yieldably expanding said telescoping members, said means for actuating said brake system being carried on one of said movable members and being movable relative to said hydraulic cylinders,
a linkage means is connected to said hydraulic cylinder and is detachably connected to said lead vehicle, said linkage having a predetermined length to actuate said cylinder upon said lead and trailer vehicles being separated a predetermined distance,
said linkage means includes a rotatable shaft extending transversely of said tongue, a cable secured to said brake cylinder at the one end and extending around said shaft with said other end detachably connected to said lead vehicle, means securing said cable to said shaft for turning said shaft upon said cable actuating said cylinder, stop means for locking said shaft against rotation in the opposite direction as said cable actuates said brake cylinder.

7. The structure of claim 6 wherein said hydraulic brake cylinder has a piston rod extending forwardly along said tongue and engaging said means for actuating said brake system, said shaft being positioned rearwardly of the outer end of said piston rod and said one end of said cable being secured to said rod forwardly of said shaft, said cable extending around said shaft and extending forwardly to engagement with said lead vehicle.

References Cited
UNITED STATES PATENTS

| | | | |
|---|---|---|---|
| 2,101,600 | 12/1937 | Sandul | 188—112 |
| 2,135,097 | 11/1938 | Billingsley | 188—112 |
| 2,354,268 | 7/1944 | McNamara | 188—112 |
| 2,571,323 | 10/1951 | Yoder | 188—112 |
| 2,642,961 | 6/1953 | Teal | 188—112 |

DUANE A. REGER, *Primary Examiner.*